United States Patent
Aoki et al.

(10) Patent No.: US 12,545,832 B2
(45) Date of Patent: Feb. 10, 2026

(54) QUANTUM DOT-CONTAINING POLYMER AND METHOD FOR PRODUCING THE SAME

(71) Applicant: SHIN-ETSU CHEMICAL CO., LTD., Tokyo (JP)

(72) Inventors: Shinji Aoki, Annaka (JP); Yoshihiro Nojima, Annaka (JP); Kazuya Tobishima, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 604 days.

(21) Appl. No.: 17/926,392

(22) PCT Filed: Apr. 19, 2021

(86) PCT No.: PCT/JP2021/015886
§ 371 (c)(1),
(2) Date: Nov. 18, 2022

(87) PCT Pub. No.: WO2021/241071
PCT Pub. Date: Dec. 2, 2021

(65) Prior Publication Data
US 2023/0265338 A1    Aug. 24, 2023

(30) Foreign Application Priority Data
May 25, 2020    (JP) ................. 2020-090320

(51) Int. Cl.
*C09K 11/02* (2006.01)
*B82Y 20/00* (2011.01)
(Continued)

(52) U.S. Cl.
CPC .............. *C09K 11/02* (2013.01); *B82Y 20/00* (2013.01); *B82Y 40/00* (2013.01); *C09K 11/08* (2013.01); *C09K 11/70* (2013.01); *C09K 11/88* (2013.01)

(58) Field of Classification Search
CPC ......... C09K 11/02; C09K 11/08; C09K 11/70; C09K 11/88; B82Y 20/00; B82Y 40/00
(Continued)

(56) References Cited

U.S. PATENT DOCUMENTS 9,708,532 B2    7/2017 Vo et al.
2005/0161666 A1    7/2005 Park et al.
(Continued)

FOREIGN PATENT DOCUMENTS

CN    1655057 A    8/2005
CN    102272217 A    12/2011
(Continued)

OTHER PUBLICATIONS

Apr. 17, 2025 Office Action issued in Chinese Patent Application No. 202180036783.7.
(Continued)

*Primary Examiner* — Anita Nassiri-Motlagh
(74) *Attorney, Agent, or Firm* — Oliff PLC

(57) ABSTRACT

A quantum dot-containing polymer contains quantum dots that emit fluorescence by excitation light, wherein the quantum dot-containing polymer is a combined polymer of the quantum dots in which a ligand having a reactive substituent is coordinated to the outermost surface and a silicone compound having a polymerizable substituent. The quantum dot-containing polymer is stabilized by mild conditions.

18 Claims, 1 Drawing Sheet

(51) Int. Cl.
B82Y 40/00 (2011.01)
C09K 11/08 (2006.01)
C09K 11/70 (2006.01)
C09K 11/88 (2006.01)

(58) Field of Classification Search
USPC .................................................. 252/301.36
See application file for complete search history.

(56) References Cited

U.S. PATENT DOCUMENTS

| | | |
|---|---|---|
| 2010/0113813 A1 | 5/2010 | Pickett et al. |
| 2014/0369024 A1 | 12/2014 | Xu et al. |
| 2015/0267106 A1 | 9/2015 | Pillay Narrainen et al. |
| 2017/0162764 A1 | 6/2017 | Kan et al. |
| 2017/0277002 A1 | 9/2017 | Yamada et al. |
| 2018/0059442 A1 | 3/2018 | Youn et al. |
| 2018/0072857 A1 | 3/2018 | Pickett et al. |
| 2018/0079953 A1 | 3/2018 | Shin et al. |
| 2019/0322926 A1 | 10/2019 | Chae et al. |

FOREIGN PATENT DOCUMENTS

| | | |
|---|---|---|
| CN | 104105739 A | 10/2014 |
| CN | 107636111 A | 1/2018 |
| CN | 107857885 A | 3/2018 |
| JP | 2016-111292 A | 6/2016 |
| JP | 2017-514299 A | 6/2017 |
| JP | 2019-536653 A | 12/2019 |
| KR | 102046831 B1 | 11/2019 |
| WO | 2019/211257 A1 | 11/2019 |

OTHER PUBLICATIONS

1 May 2, 2023 Office Action issued in Japanese Patent Application No. 2020-090320.

Nov. 17, 2022 International Preliminary Report on Patentability issued in International Application No. PCT/JP2021/015886.

Jul. 6, 2021 Search Report issued International Application No. PCT/JP2021/015886.

Feb. 13, 2025 Office Action issued in Korean Patent Application No. 10-2022-7040221.

Sep. 6, 2025 Office Action issued in Chinese Patent Application No. 202180036783.7.

Sep. 30, 2025 Office Action issued in Korean Patent Application No. 10-2022-7040221.

Nov. 11, 2025 Office Action issued in Chinese Patent Application No. 202180036783.7.

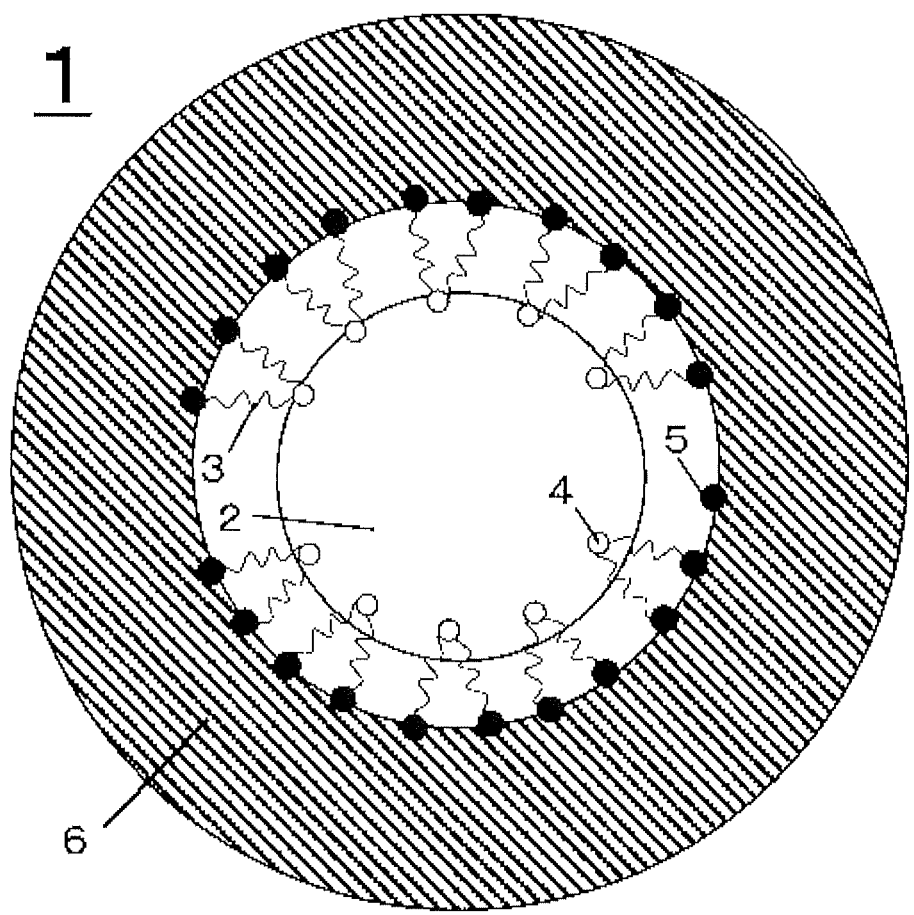

QUANTUM DOT-CONTAINING POLYMER AND METHOD FOR PRODUCING THE SAME

TECHNICAL FIELD

The present invention relates to a quantum dot-containing polymer and a method for producing the same.

BACKGROUND ART

In a semiconductor nanoparticle single crystal, when crystal size becomes smaller than Bohr radius of excitons, a strong quantum confinement effect occurs and energy levels become discrete. The energy level depends on the crystal size, and the light absorption wavelength and the emission wavelength can be adjusted by the crystal size. In addition, the emission due to exciton recombination of the semiconductor nanoparticle single crystal becomes highly efficient due to the quantum confinement effect, and the emission is basically an emission line. It is attracting attention because it enables high luminance and narrow-band light emission if a particle size distribution with uniform size can be realized.

The phenomenon caused by the strong quantum confinement effect in such nanoparticles is called the quantum size effect, and studies are being conducted to widely apply and develop semiconductor nanocrystals utilizing this property as quantum dots (QDs).

As an application of quantum dots, its use as a fluorescent material for displays has been studied. If it is possible to realize high-efficiency light emission in a narrow band, it becomes possible to express colors that could not be reproduced by existing technology, so it is attracting attention as a next generation display material.

A quantum dot liquid crystal display is one of the displays in which the use of quantum dots is currently being promoted, and commercialization is already underway. Attempts have been made to convert white light or light emitted from a blue LED backlight to green or red by passing it through a wavelength conversion member containing quantum dots.

However, since the surface of the quantum dots is active, and the quantum yield gradually decreases due to moisture and oxygen in the atmosphere, improvement of stability is an essential item to consider for wavelength conversion members containing quantum dots.

Various studies have been made on stabilization of wavelength conversion members containing quantum dots. One example is gas barrier sealing. Stability is improved by forming an inner layer in which the quantum dots are dispersed in an amphiphilic polymer or compatible polymer, and dispersed in another resin layer with low gas permeability.

In Patent Document 1, it has been disclosed a method of forming polymer beads by dispersing QDs in a hydrophobic resin layer, modifying the surface of the polymer beads so that they are dispersed in a hydrophilic polymer, and dispersing them in a hydrophilic polymer. Hydrophilic polymers tend to have higher gas barrier properties than hydrophobic polymers, so QDs are dispersed in such a bilayer or multilayer structure.

However, it has been taken a method that the QD film is sandwiched between gas barrier films to remove the effects of oxygen and water vapor, as the gas barrier properties are insufficient for use in applications that can be subject to high temperature and high humidity environments such as those used in liquid crystal display units.

Various studies have also been conducted on methods for producing polymer beads. In Patent Document 2, it is disclosed a method that QD-containing polymer beads are prepared from poly-siloxane having an amino group and a polymerizable functional group, and another polymer having another polymerizable functional group is mixed, emulsified, and further cured. In this method, it is possible to increase the concentration of QDs contained in the polymer beads by increasing the adhesion to the QDs by using a polymer introduced with a ligand that coordinates to the surface of the QDs, thereby improving the stability. However, even with this method, the stability is insufficient, and it is mounted by sandwiching it with a barrier film.

The use of a barrier film not only increases the cost, but also inevitably increases the thickness. At present, liquid crystal displays are required to be thinner, it is necessary to reduce the thickness of the wavelength conversion member, and it is required that improvement of the stability while barrier film free.

Patent Document 3 has been published as a study of improving heat resistance and moisture resistance without using a barrier film. In this method, the multi-layered resin composition using the polymer beads structure of Patent Document 1 is further subjected to silazane coating treatment, which improves the stability. However, this method has a problem that the quantum yield is lowered when the silazane coating is photocured by irradiation with short ultraviolet rays (170 nm).

In addition, Patent Document 4 has been published as another attempt. In this method, quantum dots are coordinated with ligands, reactive substituent such as a vinyl group or a methacrylic group is introduced into the ligands, a Si—H containing silicone resin and a curing agent are mixed, and spin coating is performed as it is to produce a film with improved heat resistance and moisture resistance by coating and curing by heating.

However, the Si—H containing silicone resin and quantum dots used have low compatibility, and aggregation occurs when attempting to disperse them at a high concentration. Therefore, the compatibility must be improved by ligand treatment, but if the balance between the hydrophobic group and the hydrophilic group changes when the ligand is coordinated, there is a problem that aggregation easily occurs and the quantum yield decreases.

CITATION LIST

Patent Literature

Patent Document 1: U.S. Pat. No. 9,708,532
Patent Document 2: JP 2016-111292 A
Patent Document 3: JP 2019-536653 T
Patent Document 4: United States Patent Application Publication 2019/0322926

SUMMARY OF INVENTION

Technical Problem

As described above, at present, as a method for improving the stability while maintaining the properties of QDs, it has been necessary to disperse the QDs in hydrophobic or highly compatible polymer beads, to prepare a hydrophilic polymer with low gas permeability and to be sealed inside and further with a gas barrier film. As a method for improving stability with gas barrier film free, there are a silazane treatment method and a method of sealing by reacting a reactive ligand with Si—H containing silicone, but there has been a problem that the luminous characteristics of QDs tend to deteriorate.

The present invention has been made in view of the above problems, and an object of the present invention is to provide a quantum dot-containing polymer stabilized under mild conditions and a method for producing the same.

Solution to Problem

The present invention has been made to achieve the above objects, and provides a quantum dot-containing polymer containing quantum dots that emit fluorescence by excitation light, wherein the quantum dot-containing polymer is a combined polymer of the quantum dots in which a ligand having a reactive substituent is coordinated to the outermost surface and a silicone compound having a polymerizable substituent.

According to such a quantum dot-containing polymer, it becomes a quantum dot-containing polymer of which the stability is improved by inactivating the quantum dot surface under mild conditions by increasing the steric hindrance of the ligand and suppressing aggregation.

At this time, the ligand preferably has one or more of an amino group, a thiol group, a carboxyl group, a phosphino group and an ammonium ion.

Such a ligand is a ligand with excellent coordinating properties, is reliably coordinated to the outermost surface of the quantum dot, and can be polymerized with a silicone compound that causes a large steric hindrance to the quantum dot.

At this time, the reactive substituents possessed by the ligand are preferably one or more of a vinyl group, an acrylic group, and a methacrylic group.

In this way, even a large ligand can be polymerized with the silicone compound, resulting in a more stable quantum dot-containing polymer. Moreover, these reactive substituents are excellent in dispersibility in a solvent and can be suitably used.

At this time, the polymerizable substituent of the silicone compound is preferably one or more of a vinyl group, an acrylic group, and a methacrylic group.

With such a polymerizable substituent, the polymerizable substituent is more polymerizable with the quantum dots in which a ligand having a reactive substituent is coordinated to the outermost surface, resulting in a more stable quantum dot-containing polymer.

At this time, the quantum dot-containing polymer is preferably obtained by photopolymerizing the quantum dots in which the ligand having the reactive substituent is coordinated to the outermost surface and the silicone compound having the polymerizable substituent.

In this way, if it is a photopolymer, a quantum dot-containing polymer can be formed quickly by irradiating light, and it becomes possible to prevent the aggregation of the cured polymers and to reduce the decrease rate of the quantum yield at the time of polymer formation, and to narrow the particle size distribution of the polymer.

Moreover, at this time, the wavelength conversion member can be a cured product of a resin composition in which the quantum dot-containing polymer is dispersed in a resin.

Such a wavelength conversion material is a highly reliable wavelength conversion material that can be produced under relatively mild conditions.

Further, the present invention provides a method for producing a quantum dot-containing polymer containing quantum dots that emit fluorescence by excitation light, comprising, a ligand exchange step of mixing a solution in which the quantum dots are dispersed and a compound containing a ligand having a reactive substituent, and coordinating the ligand having the reactive substituent to the outermost surface of the quantum dot, after the step, a polymerization step wherein a silicone compound containing a polymerizable substituent to the reactive substituent is added to the solution containing the quantum dots in which the reactive substituent is coordinated to the outermost surface and mixed, and the quantum dots and the silicone compound are polymerized to synthesize a quantum dot-containing polymer.

With such a method for producing a quantum dot-containing polymer, a stabilized quantum dot-containing polymer can be produced under conditions that have little effect on light emission behavior such as quantum yield and emission wavelength because the reaction is performed under mild conditions.

Advantageous Effects of Invention

As described above, according to the quantum dot-containing polymer of the present invention, the quantum dot (QD) surface is deactivated under mild conditions by increasing the steric hindrance of the ligand, and aggregation is suppressed, as a result, a quantum dot-containing polymer with improved stability is obtained. In addition, it has been found that the larger the ligand becomes, the smaller the amount of ligand that can be coordinated to the QD surface, thus limiting the improvement in stability. Therefore, a quantum dot-containing polymer in which the steric hindrance of the ligand is grown by a ligand having a reactive substituent such as a vinyl group, an acrylic group, or a methacrylic group is coordinated to the surface of the QD, and a silicone compound having a substituent capable of photopolymerization (radical polymerization) is reacted with the ligand has been investigated. As a result, it has been found that it has become possible to coat the QD surface with a silicone compound that has a large steric hindrance, and in a reliability test at 85° C. and 85% RH without a barrier film, it can be suppressed the rate of decrease in internal quantum efficiency during 250 hrs treatment being within 10%, and further stabilization becomes possible. In addition, it has been found that the compatibility with the silicone resin is improved because the QD surface can be coated with the silicone compound.

Further, according to the method for producing a quantum dot-containing polymer of the present invention, the quantum dot-containing polymer stabilized under conditions that have little effect on light emission behavior such as quantum yield and light emission wavelength due to the reaction under mild conditions can be obtained.

BRIEF DESCRIPTION OF DRAWINGS

FIG. 1 is a schematic cross-sectional view showing an example of a quantum dot-containing polymer.

DESCRIPTION OF EMBODIMENTS

The present invention will be described in detail below, but the present invention is not limited to these.

As described above, a need exists for a quantum dot-containing polymer that is stabilized under mild conditions and a method for producing the same.

The inventors of the present invention have made intensive studies on the above problems, and as a result, have found that the a quantum dot-containing polymer containing quantum dots, wherein the quantum dot-containing polymer is obtained by reacting the quantum dots in which a ligand having a reactive substituent is coordinated to the outermost surface and a silicone compound having a polymerizable substituent, can improve stability as a result by suppressing aggregation by making the steric hindrance of the ligand larger and the quantum dot outermost surface becomes inactive and mild, and have completed the present invention.

That is, the present invention is a quantum dot-containing polymer containing quantum dots that emit fluorescence by excitation light, wherein the quantum dot-containing polymer is a combined polymer of the quantum dots in which a ligand having a reactive substituent is coordinated to the outermost surface and a silicone compound having a polymerizable substituent. Description will be made below with reference to the drawings.

(Quantum Dot-Containing Polymer)

FIG. 1 shows a schematic cross-sectional view of an example of the quantum dot-containing polymer 1 of the present invention. The quantum dot-containing polymer 1 is a polymer of the quantum dot 2 and a silicone compound 6 having a polymerizable substituent 5, wherein a ligand 4 having a reactive substituent 3 is coordinated to the outermost surface of the quantum dot 2.

The quantum dot-containing polymer is not particularly limited as long as it is a polymer of a quantum dot in which a ligand having a reactive substituent is coordinated to the outermost surface and a silicone compound having a polymerizable substituent described later, but is preferably photopolymerized. If it is a photopolymer, a quantum dot-containing polymer is quickly formed by irradiating light, and it becomes possible to prevent the aggregation of the cured polymers, so the decrease in quantum yield during polymer formation can be made smaller and the particle size distribution of the polymer can be narrowed.

(Quantum Dot)

The quantum dot 2 according to the present invention has a ligand 3 having a reactive substituent 4, which will be described later, coordinated to the outermost surface of the quantum dot 2. Although the quantum dot 2 shown in FIG. 1 is spherical, the shape of the quantum dots in the present invention is not particularly limited, and any shape can be used. That is, quantum dots are mainly nanoparticles of 10 nm or less, but may be nanowires, nanorods, nanotubes, nanocubes, etc., and any shape can be applied.

Quantum dots 2 can be made of any suitable material, for example, as semiconductor materials, one or more compounds selected from the group consisting of single, multiple, mixed crystals and alloys of II-VI group, III-V group, IV group, IV-VI group, I-III-VI group compounds, or compounds having a perovskite structure can be used.

As specific materials, compounds including ZnS, ZnSe, ZnTe, CdS, CdSe, CdTe, AlN, AlP, AlAs, AlSb, GaN, GaP, GaAs, GaSb, InN, InP, InAs, InSb, Si, Ge, Sn, Pb, PbS, PbSe, PbTe, SnS, SnSe, SnTe, $AgGaS_2$, $AgInS_2$, $AgGaSe_2$, $AgInSe_2$, $CuGaS_2$, $CuGaSe_2$, $CuInS_2$, $CuInS_2$, $ZnSiP_2$, $ZnGeP_2$, $CdSiP_2$, $CdGeP_2$, $CsPbCl_3$, $CsPbBr_3$, $CsPbI_3$, $CsSnCl_3$, $CsSnBr_3$, $CsSnI_3$ can be mentioned, but not limited to these.

Also, the quantum dots used in the present invention can have a core-shell structure. The core material capable of forming a core-shell structure is not particularly limited, but for example, one or more selected from the group consisting of the above mentioned compounds can be used. The shell material capable of forming the core-shell structure is not particularly limited, but preferably has a large bandgap and low lattice mismatch with respect to the core material, and can be arbitrarily combined according to the core material.

As specific shell materials, ZnO, ZnS, ZnSe, ZnTe, CdS, CdSe, CdTe, AlN, AlP, AlAs, AlSb, GaN, GaP, GaAs, GaSb, InN, InP, InAs, InSb, BeS, BeSe, BeTe, MgS, MgSe, MgTe, PbS, PbSe, PbTe, SnS, SnSe, SnTe, CuF, CuCl, CuBr, CuI can be mentioned and above mentioned materials may be selected singly, in multiples, as alloys or mixed crystals, but not limited to this.

There are various methods for producing semiconductor nanoparticles, such as a liquid phase method and a vapor phase method, but the method is not particularly limited in the present invention. From the viewpoint of exhibiting high fluorescence luminous efficiency, it is preferable to use quantum dots (semiconductor nanoparticles) obtained by using a hot soap method or a hot injection method, in which precursor species are reacted at high temperature in a nonpolar solvent with a high boiling point. It is desirable that the surface is coordinated with a ligand that is an organic ligand, in addition to the ligand having a reactive substituent, which will be described later, to impart dispersibility in a nonpolar solvent, and to reduces surface defects.

The ligand (organic ligand) preferably contains an aliphatic hydrocarbon from the viewpoint of dispersibility. As examples of such ligands, oleic acid, stearic acid, palmitic acid, myristic acid, lauric acid, decanoic acid, octanoic acid, oleylamine, stearyl (octadecyl) amine, dodecyl (lauryl) amine, decylamine, octylamine, octadecanethiol, hexadecanethiol, tetradecanethiol, dodecanethiol, decanethiol, octanethiol, trioctylphosphine, trioctylphosphine oxide, triphenylphosphine, triphenylphosphine oxide, tributylphosphine, tributylphosphine oxide, or the like can be mentioned, and it may be used alone or in combination.

(Ligands with Reactive Substituents)

In addition to the above ligands, the quantum dots of the present invention are coordinated with ligands having polymerizable substituents. As a ligand having a polymerizable substituent, it is desirable to have a substituent that interacts with or adsorbs to the quantum dot surface. As substituents that adsorb or react on the quantum dot surface, an amino group, a thiol group, a carboxy group, a phosphine group, a phosphine oxide group, a sulfonyl group, quaternary ammonium salt, or the like can be mentioned. From the viewpoint of strength of coordination, an amino group, a thiol group, a carboxy group, a phosphine group and quaternary ammonium salt are preferable.

As polymerizable substituents possessed by ligands, a vinyl group, an acryl group, a methacryl group, an epoxy group and an oxetanyl group can be mentioned. From the viewpoint of dispersibility in hydrophobic solvent, a vinyl group, an acryl group and a methacryl group are preferred.

Such ligand include N, N-dimethylallylamine and the like. If the linear chain is too long, the amount of the ligand to be coordinated is reduced, and the amount that can be polymerized and interacted with the polymer is reduced. It is preferable that the number of linear chains is 20 or less.

(Silicone Compound)

Further, in the quantum dot-containing polymer of the present invention, the surface of the quantum dots is coated with a silicone compound (poly-siloxane).

Therefore, there is no particular limitation as long as it is a silicone compound having a polymerizable group that can be reacted with the ligand having the above mentioned reactive substituent. It is preferably in a liquid or oily state from the viewpoint of compatibility with the quantum dots with which the ligands are coordinated and the hydrophobic solvent, and uniform reaction before polymerization. At least one polymerizable substituent may be present on either or both of the molecular chain terminal and the side chain.

As such compounds, vinyl-modified silicone oil, acrylic-modified silicone oil, methacrylic-modified silicone oil and the like are preferable. From the viewpoint of compatibility, as long as aggregation does not occur, several kinds of modified silicone oils may be mixed, and there is no particular limitation.

(Photo-Initiator)

The quantum dot-containing polymer of the present invention also preferably contains a photopolymerization initiator. A photo-initiator, a quantum dot coordinated with a ligand having a polymerizable substituent, and a silicone oil having a polymerizable substituent are mixed, stirred, mixed uniformly in a hydrophobic solvent, and then irradiated with ultraviolet rays. Thus, it can be rapidly converted into a photopolymer.

As a photopolymerization initiator, the Irgacure (registered trademark) series commercially available from BASF Corporation, for example, Irgacure 290, Irgacure 651, Irgacure 754, Irgacure 184, Irgacure 2959, Irgacure 907, Irgacure 369, and Irgacure 379, Irgacure 819, Irgacure 1173 or the like can be mentioned. In the Darocure (registered trademark) series, for example, TPO, Darocure 1173 or the like can be mentioned. In addition, a known radical polymerization initiator or cationic polymerization initiator may be included.

The content of the photopolymerization initiator is preferably 0.1 to 10 parts by mass, more preferably 0.2 to 5 parts by mass, per 100 parts by mass of the modified silicone oil to be added.

(Method for Producing Quantum Dot-Containing Polymer)

The present invention also provides a method for producing a quantum dot-containing polymer containing quantum dots that emit fluorescence by excitation light, comprising, a ligand exchange step of mixing a solution in which the quantum dots are dispersed and a compound containing a ligand having a reactive substituent, and coordinating the ligand having the reactive substituent to the outermost surface of the quantum dot, after the step, a polymerization step wherein a silicone compound containing a polymerizable substituent to the reactive substituent is added to the solution containing the quantum dots in which the reactive substituent is coordinated to the outermost surface and mixed, and the quantum dots and the silicone compound are polymerized to synthesize a quantum dot-containing polymer. With such a method for producing a quantum dot-containing polymer, a stabilized quantum dot-containing polymer can be produced efficiently under conditions that have little effect on light emission behavior such as quantum yield and emission wavelength because the reaction is performed under mild conditions.

(Ligand Exchange Step)

First, quantum dots coordinated with ligands containing long-chain hydrocarbons are dispersed in a hydrophobic solvent and mixed with ligands having reactive substituents to perform ligand exchange. In the ligand exchange reaction, conditions such as the amount of addition, heating temperature, time, and light irradiation are appropriately changed depending on the type of ligand.

Next, if the ligand remaining after the ligand exchange or the ligand that has been loosed affects the photopolymerization with the modified silicone oil, it is preferable to purify the ligand once. For example, if a mercapto group remains, a thioene reaction occurs, removing it increases the amount of reaction between the ligand on the surface of the quantum dot and the modified silicone oil, so the surface stabilization effect of the quantum dot can be increased.

(Polymerization Process)

Next, the quantum dots coordinated with ligands having reactive substituents after ligand exchange are dispersed in a hydrophobic solvent, and a modified silicone oil having polymerizable substituents and a polymerization initiator are added and mixed. As examples of hydrophobic solvents, pentane, hexane, octane, benzene, toluene, octadecene, or the like can be mentioned, but are not limited to these.

Finally, a quantum dot-containing polymer in which the surface of the quantum dots is coated with silicone can be obtained by polymerizing while performing light irradiation.

(Wavelength Conversion Member Having Quantum Dot-Containing Polymer)

The wavelength conversion member of the present invention is a resin composition containing the quantum dot-containing polymer is dispersed in the resin. Although the resin material is not particularly limited, it is preferable that the quantum dot-containing polymer does not aggregate and deterioration of fluorescence luminous efficiency does not occur. As examples thereof, silicone resin, acrylic resin, epoxy resin, urethane resin, fluororesin or the like can be mentioned. These materials preferably have a high transmittance, particularly preferably a transmittance of 70% or more, in order to increase fluorescence luminous efficiency as a wavelength conversion material.

Moreover, the form of the wavelength conversion member in the present invention is not particularly limited, but a wavelength conversion film in which the quantum dot-containing polymer is dispersed in the resin by curing after being processed into a sheet shape is exemplified.

The method for producing the wavelength conversion material is not particularly limited, but for example, the quantum dot-containing polymer is dispersed in an acrylic resin, the resin composition is applied to a transparent film such as PET or polyimide, cured, and laminated, then the wavelength conversion materials can be obtained. Application to the transparent film can be carried out by a spraying method such as a spray or an inkjet method, spin coating or a bar coater.

Although the method for curing the resin composition is not particularly limited, for example, the film coated with the resin composition can be heated at 60° C. for 2 hours and then at 150° C. for 4 hours. In addition, the resin composition may be cured using a photopolymerization reaction, which can be appropriately changed according to the application.

EXAMPLES

The present invention will be described in more detail below using Examples and Comparative Example, but the present invention is not limited to these. In these examples, core-shell type quantum dots of InP/ZnSe/ZnS were used as quantum dot materials.

Example 1

(Quantum Dot Core Synthesis Process)

0.23 g (0.9 mmol) of palmitic acid, 0.088 g (0.3 mmol) of indium acetate, and 10 mL of 1-octadecene were added to a flask, and the mixture was heated and stirred at 100° C. under reduced pressure to dissolve the raw materials. Degassing was performed for 1 hour. After that, nitrogen was purged into the flask, and 0.75 mL (0.15 mmol) of a solution prepared by mixing trimethylsilylphosphine with trioctylphosphine and adjusted to 0.2 M was added and the temperature was raised to 300° C., and it was confirmed that the solution changed from yellow to red and the core particles were formed.

(Quantum Dot Shell Layer Synthesis Step)

Next, 2.85 g (4.5 mmol) of zinc stearate and 15 mL of 1-octadecene were added to another flask, heated and stirred at 100° C. under reduced pressure, and degassed for 1 hour while dissolving to prepare 0.3 M zinc octadecene stearate solution, and 3.0 mL (0.9 mmol) was added to the reaction solution after core synthesis and cooled to 200° C. Next, 0.474 g (6 mmol) of selenium and 4 mL of trioctylphosphine were added to another flask and dissolved by heating to 150° C. to prepare a 1.5 M selenium trioctylphosphine solution. While raising the temperature of the reaction solution after the core synthesis step cooled at 200° C. to 320° C. for 30 minutes, the selenium trioctylphosphine solution in 0.1 mL increments so that a total of 0.6 mL (0.9 mmol) was added, and the mixture was maintained at 320° C. for 10 minutes, then, it was cooled to room temperature. 0.44 g (2.2 mmol) of zinc acetate was added and dissolved by heating and stirring at 100° C. under reduced pressure. The inside of the flask was purged again with nitrogen, the temperature was raised to 230° C., 0.98 mL (4 mmol) of 1-dodecanethiol was added, and the mixture was maintained for 1 hour. The resulting solution was cooled to room temperature to prepare a core-shell quantum dot composed of InP/ZnSe/ZnS containing solution.

(Ligand Exchange Step)

2-propene-1-thiol (Tokyo Chemical Industry Co., Ltd.) was used as a ligand having a reactive substituent. As the ligand exchange reaction, the solution after the shell synthesis step cooled to room temperature was heated to 60° C., 0.08 mL (1.0 mmol) of 2-propene-1-thiol was added, and the mixture was stirred for 1 hour. After completion of the reaction, the reaction solution was cooled to room temperature, ethanol was added to precipitate the reaction solution, centrifuged, and the supernatant was removed. A similar purification was performed once more and dispersed in toluene to prepare a quantum dot solution in which a ligand having a reactive substituent was coordinated to the outermost surface.

(Quantum Dot-Containing Composition Synthesis Step)

The quantum dot toluene solution after the ligand exchange step was added to a flask that had been purged with nitrogen in advance, and methacrylic modified silicone oil X-32-3817-3 (Shin-Etsu Chemical Co., Ltd.) was added in an amount of 2 parts by mass to 100 parts by mass of the quantum dot toluene solution. After stirring, mixing and defoaming, the mixture was irradiated with light having a wavelength of 365 nm and an output of 4000 mW/cm$^2$ for 20 seconds from a UVLED irradiation device while stirring. After completion of the reaction, ethanol was added to precipitate, the supernatant was removed after centrifugation, and the mixture was dispersed again in toluene to obtain a quantum dot-containing composition.

(Manufacturing Method of Wavelength Conversion Member)

A wavelength conversion material was produced using the obtained quantum dot-containing composition. 1.0 g of a 1.0 wt % toluene solution of the quantum dot-containing composition is mixed with 10.0 g of a silicone resin (LPS-5547 manufactured by Shin-Etsu Chemical Co., Ltd.) and heated at 60° C. while stirring under reduced pressure to remove the solvent. Thereafter, vacuum degassing was performed, the composition was applied onto a polyethylene terephthalate (PET) film having a thickness of 50 μm, and a semiconductor nanoparticle resin layer having a thickness of 100 μm was formed using a bar coater. Furthermore, a PET film was pasted and laminated on this resin layer. This film was heated at 60° C. for 2 hours and then at 150° C. for 4 hours to cure the semiconductor nanoparticle resin layer, thereby producing a wavelength conversion material.

(Emission Wavelength, Emission Half Value Width, Emission Efficiency Measurement)

As a fluorescence emission characteristic evaluation of quantum dots, Quantum efficiency measurement system (QE-2100) manufactured by Otsuka Electronics Co., Ltd. is used to measure the emission wavelength, fluorescence emission half value width and fluorescence luminous efficiency (internal quantum efficiency) of quantum dots at an excitation wavelength of 450 nm was measured.

(Reliability Test)

The obtained wavelength conversion material was treated under conditions of 85° C. and 85% RH (relative humidity) for 250 hours, and the reliability was evaluated by measuring the fluorescence luminous efficiency of the treated wavelength conversion material.

Example 2

As Example 2, it was prepared in the same manner as in Example 1, except that the ligand used in the ligand exchange step was N, N-dimethylallylamine (manufactured by Tokyo Chemical Industry Co., Ltd.).

Example 3

As Example 3, it was prepared in the same manner as in Example 1, except that the ligand used in the ligand exchange step was allyldiphenylphosphine (manufactured by Fuji Film Wako Pure Chemical Industries, Ltd.).

Example 4

As Example 4, it was prepared in the same manner as in Example 1, except that the ligand used in the ligand exchange step was 3-allyloxypropionic acid (manufactured by Tokyo Chemical Industry Co., Ltd.).

Example 5

As Example 5, it was prepared in the same manner as in Example 1, except that the ligand used in the ligand exchange step was trimethylvinylammonium bromide (manufactured by Tokyo Chemical Industry Co., Ltd.).

Example 6

As Example 6, it was prepared in the same manner as in Example 1, except that the ligand used in the ligand exchange step was trimethylvinylbenzylammonium chloride (manufactured by Tokyo Chemical Industry Co., Ltd.).

Example 7

As Example 7, it was produced in the same manner as in Example 1, except that the ligand used in the ligand exchange step was N-[2-(methacryloyloxy) ethyl]-N, N-dimethylbutane-1-aminium bis (trifluoromethanesulfonyl) imide (manufactured by Tokyo Chemical Industry Co., Ltd.).

Example 8

As Example 8, it was prepared in the same manner as in Example 1, except that the ligand used in the ligand exchange step was N-(2-acryloyloxyethyl)-N-benzyl-N,N-dimethylammonium chloride (about 75% aqueous solution) (manufactured by Tokyo Chemical Industry Co., Ltd.).

COMPARATIVE EXAMPLE

Prepared in the same manner as in Example 1 up to the quantum dot shell layer synthesis step, the wavelength conversion member was produced in the same manner as in Example 1 except for the ligand exchange step and the quantum dot-containing composition synthesis step.

Table 1 shows the fluorescence luminous efficiencies after the wavelength conversion materials of Examples 1 to 8 and Comparative Example have been produced, and the fluorescence luminous efficiencies after the reliability evaluation.

TABLE 1

|  |  | Example 1 | Example 2 | Example 3 | Example 4 | Example 5 | Example 6 | Example 7 | Example 8 | Comparative Example |
|---|---|---|---|---|---|---|---|---|---|---|
| After synthesis of quantum dots | Wavelength (nm) | 532 | 532 | 532 | 532 | 532 | 532 | 532 | 532 | 532 |
|  | Half value width (nm) | 42 | 42 | 42 | 42 | 42 | 42 | 42 | 42 | 42 |
|  | Internal quantum efficiency (%) | 61 | 61 | 61 | 61 | 61 | 61 | 61 | 61 | 61 |
| After ligand exchange | Wavelength (nm) | 533 | 533 | 532 | 534 | 532 | 531 | 532 | 535 | — |
|  | Half value width (nm) | 41 | 42 | 41 | 42 | 42 | 41 | 42 | 43 | — |
|  | internal quantum efficiency (%) | 64 | 66 | 61 | 63 | 64 | 65 | 63 | 61 | — |
| Quantum dot containing composition | Wavelength (nm) | 535 | 535 | 538 | 534 | 533 | 531 | 532 | 534 | — |
|  | Half value width (nm) | 41 | 42 | 41 | 42 | 42 | 41 | 42 | 42 | — |
|  | Internal quantum efficiency (%) | 63 | 64 | 59 | 62 | 63 | 63 | 64 | 62 | — |
| Wavelength conversion member | Wavelength (nm) | 536 | 535 | 540 | 535 | 533 | 532 | 534 | 534 | 548 |
|  | Half value width (nm) | 41 | 42 | 42 | 42 | 42 | 41 | 42 | 42 | 58 |
|  | Internal quantum efficiency (%) | 48 | 49 | 41 | 45 | 47 | 48 | 47 | 48 | 20 |
| Quantum yield change during reliability test | Decreasing rate (%) | 7 | 9 | 10 | 8 | 5 | 3 | 6 | 6 | 51 |

From the results in Table 1, it can be seen that the Comparative Example has a lower quantum yield and a large emission wavelength shift to longer wavelength. When observed with a microscope, many aggregates of about 10 to 50 μm have been observed in the Comparative Example, resulting in a decrease in quantum yield.

On the other hand, in Examples 1 to 8, since the aggregates are small and their number is small, it is considered that the decrease in quantum yield is suppressed. In Examples 1 to 8, it can be seen that large steric hindrance can be introduced by the silicone compound coating, and aggregation is effectively suppressed. In addition, when comparing the results of the reliability test (85° C., 85% RH, 250 hours treatment), it can be seen that all of Examples 1 to 8 have improved stability than Comparative Example, and the decrease in quantum yield is suppressed to 10% or less.

As described above, it has been confirmed that the quantum dot-containing polymer in the present invention exhibits high stability, and the wavelength conversion material using the same has high reliability because degradation of fluorescence luminous efficiency is suppressed under high temperature and high humidity conditions.

The present invention is not limited to the above embodiment. The above-described embodiment is an example, and any examples having substantially the same structure as the technical idea described in the claims of the present invention and having the same effect is included in the technical scope of the present invention.

The invention claimed is:

1. A quantum dot-containing polymer containing quantum dots that emit fluorescence by excitation light,
   wherein the quantum dot-containing polymer is a combined polymer of the quantum dots in which a ligand having a reactive substituent is coordinated to the outermost surface and a silicone compound having a polymerizable substituent.

2. The quantum dot-containing polymer according to claim 1, wherein the ligand has one or more of an amino group, a thiol group, a carboxyl group, a phosphino group, and an ammonium ion.

3. The quantum dot-containing polymer according to claim 1, wherein the reactive substituents possessed by the ligand are one or more of a vinyl group, an acrylic group, and a methacrylic group.

4. The quantum dot-containing polymer according to claim 2, wherein the reactive substituents possessed by the ligand are one or more of a vinyl group, an acrylic group, and a methacrylic group.

5. The quantum dot-containing polymer according to claim 1, wherein the polymerizable substituent of the silicone compound is one or more of a vinyl group, an acrylic group, and a methacrylic group.

6. The quantum dot-containing polymer according to claim 2, wherein the polymerizable substituent of the silicone compound is one or more of a vinyl group, an acrylic group, and a methacrylic group.

7. The quantum dot-containing polymer according to claim 3, wherein the polymerizable substituent of the silicone compound is one or more of a vinyl group, an acrylic group, and a methacrylic group.

8. The quantum dot-containing polymer according to claim 4, wherein the polymerizable substituent of the silicone compound is one or more of a vinyl group, an acrylic group, and a methacrylic group.

9. The quantum dot-containing polymer according to claim 1, wherein the quantum dot-containing polymer is obtained by photopolymerizing the quantum dots in which the ligand having the reactive substituent is coordinated to the outermost surface and the silicone compound having the polymerizable substituent.

10. The quantum dot-containing polymer according to claim 2, wherein the quantum dot-containing polymer is obtained by photopolymerizing the quantum dots in which the ligand having the reactive substituent is coordinated to the outermost surface and the silicone compound having the polymerizable substituent.

11. The quantum dot-containing polymer according to claim 3, wherein the quantum dot-containing polymer is obtained by photopolymerizing the quantum dots in which the ligand having the reactive substituent is coordinated to the outermost surface and the silicone compound having the polymerizable substituent.

12. The quantum dot-containing polymer according to claim 4, wherein the quantum dot-containing polymer is obtained by photopolymerizing the quantum dots in which the ligand having the reactive substituent is coordinated to the outermost surface and the silicone compound having the polymerizable substituent.

13. The quantum dot-containing polymer according to claim 5, wherein the quantum dot-containing polymer is obtained by photopolymerizing the quantum dots in which the ligand having the reactive substituent is coordinated to the outermost surface and the silicone compound having the polymerizable substituent.

14. The quantum dot-containing polymer according to claim 6, wherein the quantum dot-containing polymer is obtained by photopolymerizing the quantum dots in which the ligand having the reactive substituent is coordinated to the outermost surface and the silicone compound having the polymerizable substituent.

15. The quantum dot-containing polymer according to claim 7, wherein the quantum dot-containing polymer is obtained by photopolymerizing the quantum dots in which the ligand having the reactive substituent is coordinated to the outermost surface and the silicone compound having the polymerizable substituent.

16. The quantum dot-containing polymer according to claim 8, wherein the quantum dot-containing polymer is obtained by photopolymerizing the quantum dots in which the ligand having the reactive substituent is coordinated to the outermost surface and the silicone compound having the polymerizable substituent.

17. A wavelength conversion member, wherein it is a cured product of a resin composition in which the quantum dot-containing polymer according to claim 1 is dispersed in a resin.

18. A method for producing a quantum dot-containing polymer containing quantum dots that emit fluorescence by excitation light,
comprising,
a ligand exchange step of mixing a solution in which the quantum dots are dispersed and a compound containing a ligand having a reactive substituent, and coordinating the ligand having the reactive substituent to the outermost surface of the quantum dot, after the step,
a polymerization step wherein a silicone compound containing a polymerizable substituent to the reactive substituent is added to the solution containing the quantum dots in which the reactive substituent is coordinated to the outermost surface and mixed, and the quantum dots and the silicone compound are polymerized to synthesize a quantum dot-containing polymer.

* * * * *